April 25, 1950      E. E. WEMP      2,505,450
MECHANISM FOR TRANSMITTING TORQUE
Filed March 20, 1946      4 Sheets-Sheet 4

INVENTOR.
ERNEST E. WEMP
BY
ATTORNEYS.

Patented Apr. 25, 1950

2,505,450

UNITED STATES PATENT OFFICE 2,505,450

MECHANISM FOR TRANSMITTING TORQUE

Ernest E. Wemp, Detroit, Mich., assignor of twenty per cent to Lila A. Wemp, Detroit, Mich.; five per cent to Eleanor May Wemp, Los Angeles, Calif.; five per cent to Leah K. Smith, and five per cent to Clyde J. Smith, both of Detroit, Mich.

Application March 20, 1946, Serial No. 655,838

14 Claims. (Cl. 74—330)

The herein invention has to do with the transmission of torque and the changing of the driving ratio between a driving member and a driven member. It is concerned particularly with transmission for use with internal combustion engines and more particularly with automotive vehicles powered by internal combustion engines.

The general object of the invention is to provide an improved torque transmitting mechanism for making a shift from one speed ratio to another while the engine is delivering torque through the mechanism. Such a mechanism or transmission may be termed a power shift transmission. In accordance with the invention, friction clutches are used, there being one friction clutch for establishing the driving connection in each ratio and these clutches are engaged and disengaged to respectively establish one ratio while disestablishing another ratio.

In a structure of this kind it is essential in order to provide a shift of the desired smoothness and nicety of action, that the action of the two clutches, one of which is engaging and the other of which is disengaging, be accurately timed relative to each other.

In carrying out the invention, hydraulic control means are preferably provided for the friction clutches and the clutches are so inter-related that the change over from one ratio to the other is timed to disengagement of one clutch and the engagement of the other. This is carried out in the structure disclosed herein by so arranging the two clutches that one of them provides the reaction for the other in the action of changing from one ratio to another. More specifically, the clutch which is about to disengage or which is in the action of disengaging, provides a reaction for the clutch which is about to engage or which is undergoing engaging action. Thus, the release of one clutch and the engagement of the other are inter-related and this inter-relation provides for an automatic timing.

This automatic timing is particularly important, and is accomplished in the structure herein shown, when a shift of the driving ratio is made from a relatively low ratio to a relatively high ratio or, in other words, in the up shift. In such a situation, the engine speed, prior to the shift, is relatively high and the engine speed, after the shift, is relatively low, assuming a constant vehicle speed, and in order to bring the engine down to the lower speed while it is delivering power and to effect the change of driving ratio with a smooth action, an accurate timing is required. In accordance with the invention the transmission may be regarded as one which is self-timing, and self-adjusting to the conditions of torque and speed existing at the moment of ratio change.

A structure for carrying out the invention is disclosed in the accompanying drawings. The mechanism shown in the drawings embodies a transmission and control of the simplest form in that a two speed arrangement is shown which embodies but a single shift structure from one ratio to the other, but it is to be understood that this arrangement may be constructed in multiples or otherwise associated with other mechanism in order to provide as many different ratios as is desired.

Fig. 2 is a cross sectional view taken substantially on line 2—2 of Fig. 1 showing the pump for the hydraulic system.

Fig. 3 is a cross sectional view through a control valve for controlling the actuation of the transmission.

The crank shaft of an internal combustion engine is shown at 1 to which is attached a fly wheel 2 disposed in a housing 3. A clutch case or housing is shown at 4 provided with a sump 5 for the hydraulic medium such as an oil. Attached to the housing 4 is another transmission housing or case 6 which may contain other transmission parts as will presently be seen. The housing 4 may be substantially sealed from the interior of the housing 6 although this is not necessary. A driving member or shaft 7 suitably connected to the crank shaft of the engine as shown at 8, extends into the housing 4 while a seal comprising a plate or disc 9 and sealing element 10 which engages the driving shaft 7 closes the housing 4 from the loss of oil.

Figure 1:
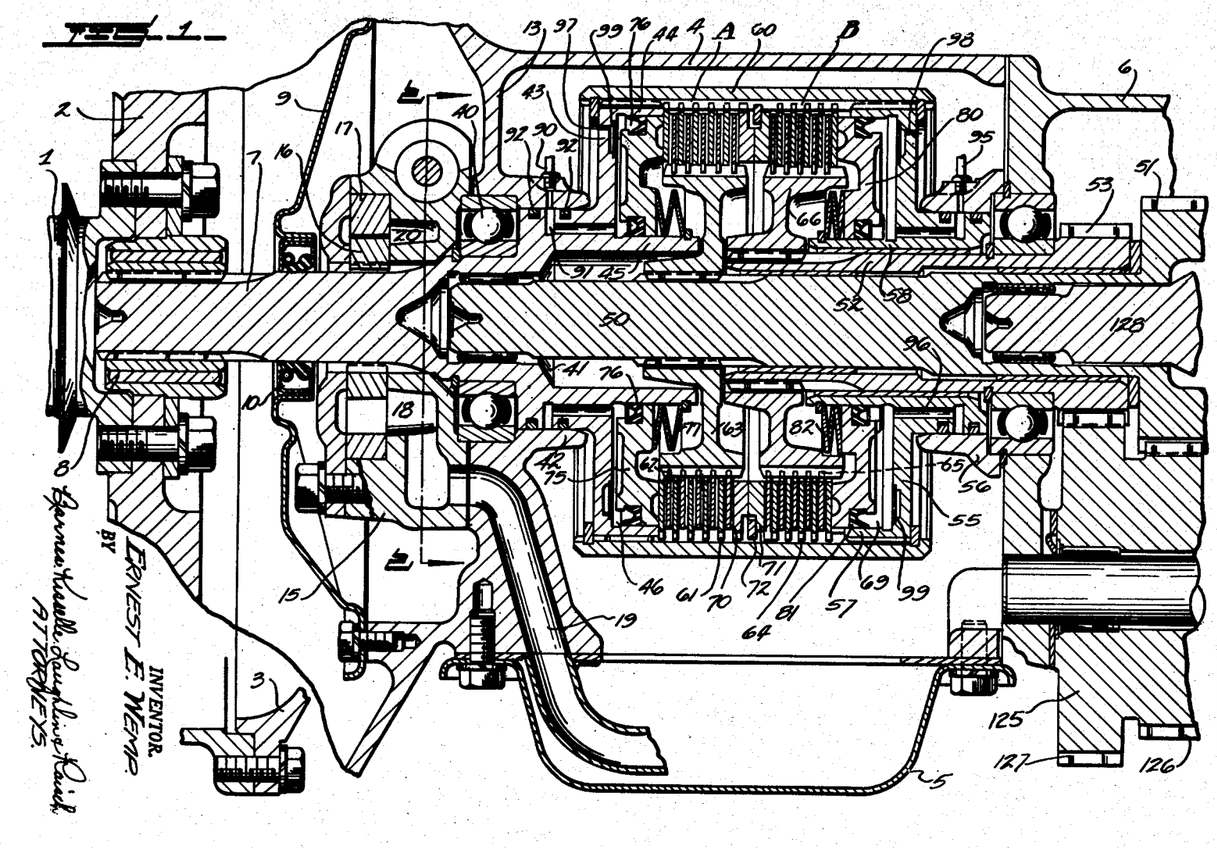
Fig. 1 is a sectional view taken through a transmission constructed in accordance with the invention and showing the same coupled to the crank shaft of an engine and associated with a power output member.

Mounted upon the driving member 7 and in a compartment which may be between the wall 13 of the housing 4 and the seal 9 is a pump generally indicated by the pump housing 15. This pump includes a rotary impeller element 16 mounted on the member 7 and provided with external tooth or rib formations as shown in Fig. 2, and operating within a rotary impeller element 17 provided with internal tooth or rib formations which cooperate with those on the member 16. The number of rib formations on the member 17 exceeds the number on the member 16 as shown in Fig. 2, with the result that with a counter-clockwise rotation as Fig. 2 is viewed, the space between the members opens up on the left hand side on the center line as Fig. 2 is viewed as shown at 18 so that liquid is drawn into the pump through the inlet 19 which extends into the sump as shown in Fig. 1. The space between the pump members on the right hand side as shown in Fig. 2 and as indicated at 20, closes incident to the rotation so that the liquid is placed under pressure and pumped out. The passages or chambers 18 and 20, as will be noted by reference to Fig. 1, extend into a plane axially removed from the plane of the rotary pump elements 16 and 17 and they are divided or separated by a wall or partition 21. Leading from the outlet side of the pump is a high pressure line 22.

This form of pump is a known type and needs no further description herein although it may be pointed out that the pressure in the hydraulic system is controlled by a relief valve structure as indicated in Fig. 2. This structure comprises a cylinder 25 formed as a part of the pump body with a valve therein having a head 26 and a head 27 and an intermediate restricted part providing a port 28. The cylinder has a port 29 which connects into the high pressure side of the pump and a port 30 connecting into the low pressure side of the pump. The head 27 has a port 31 extending therethrough; a spring 32 acts on the piston valve to urge it against a temperature sensitive seat 33, here shown as a bellows-type of chamber with end heads and which has a substantially incompressible liquid sealed therein which liquid expands with temperature increase. The cylinder also has a relief port 34. When the pressure increases, due to an increase of engine speed, the pressure is transmitted to the right hand side of the piston head 27 and shifts the piston valve to the left to thus provide a relief by connecting the high pressure inlet 29 to the low pressure outlet 30. When the engine and the hydraulic medium are cold the seat 33 contracts thus opening the port 34. As a result, a higher pump speed and higher engine speed is required to attain a predetermined pressure in the hydraulic system. This will permit of a high engine idle speed when it is cold but as the engine becomes warm in use and reaches normal running temperature the seat 33 expands and the head 27 closes or nearly closes the port 34. This particular valve structure is claimed in another application. Suffice it to say here that the piston valve is subject to and movable by the pressure of the hydraulic medium to thereby govern the by-pass from the high pressure passage 29 to the low pressure passage 30 and, therefore, regulate the pressure in the hydraulic system and, also, that the relief port 34 is open when the engine and medium are cold so that the engine may idle at relatively high speeds without attaining a pressure in the hydraulic system for operating the mechanism in question.

Referring back now to Fig. 1, it will be noted that the drive shaft 7 extends into the case 4 and is journaled in a bearing 40. It has an enlargement 41 which rotates in an extension 42 of the housing and a second enlargement 43 which, as will later be seen, constitutes a cylinder head. The portion 43 has an axially extending cylindrical portion 44. Also, extending inwardly but on a smaller radius is an extension 45. The structure provides a cylinder 46.

A member such as a shaft 50 has one end piloted in the driving shaft 7 and it extends into the casing 6 where it is provided with a gear 51. Surrounding the member 50 is a sleeve 52, the sleeve being suitably mounted on the shaft for rotation relative thereto as shown, and the sleeve 52 extends into the casing 6 and has a gear 53 thereon. Rotatably mounted on the sleeve 52 is a cylinder member 55 which, in effect, is the counter part of the portion 43 and it has a portion rotating in a fixed part 56 and an outer cylindrical extension 57 and an inner cylindrical extension 58. This provides a cylinder 69. A connector member in the form of a sleeve 60 is drivingly connected as by means of splines to the member 43 and 55 as indicated, so that these two members rotate in unison.

There is a friction clutch structure positioned operatively between the member 60 and the shaft 50 and between the member 60 and the sleeve 52. The clutch between the member 60 and the shaft 50 is a multiple disc clutch generally indicated at A having a series of driving plates or discs 61 with their outer edges keyed to the member 60 as by means of the splines aforesaid and a plurality of inner plates 62 keyed or splined to a hub 63 in turn splined, as indicated, to the shaft 50. The clutch for the sleeve 52 is similarly of the multiple disc-type generally indicated at B and having a plurality of driving plates 64 connected to the sleeve 60 and a plurality of alternately arranged driven plates 65 connected to a hub 66 which is splined as indicated to the sleeve 52.

The clutch structure A has an end plate 70 which is a driving plate while the clutch B has a similar end plate 71. These plates are so formed as indicated as to lie on opposite sides of a fixed reaction member 72 and which is disposed in a fixed position on the sleeve 60.

In the cylinder 46 is a piston 75 provided with suitable sealing elements 76 for wiping the faces of the portions 44 and 45 and this piston is formed as indicated to engage the end disc of the friction clutch A as indicated. The piston is normally held in a position against the cylinder head 43 by a spring action, this being accomplished by a stack or series of spring washers 77.

Another and similar piston 80 is mounted in cylinder 69 with sealing members 81 and it is arranged to engage the end disc 64 of the friction clutch B and it is acted upon by a spring structure as at 82 so that if otherwise uncontrolled the spring structure 82 pushes it back against the cylinder head 55. It will be understood that the driving and driven discs of both clutches are slidably mounted on their respective members 60, 63 and 66 so that they may be packed together for engagement and may slide axially for disengagement when the packing pressure is released. Moreover, the discs may be suitably faced as indicated. The facing structure, however, may be selected as desired to meet the requirements and conditions.

The cylinder structures are arranged for the introduction of a hydraulic medium such as oil, to which end a conduit 90 connects into a ported part of the extension 42, which in turn makes connection with a passage 91 formed in the part 43 of the driving member 7 and which leads to the cylinder 46. The passage 91 which has a circumferential groove structure, is sealed by suitable seals 92 on each side thereof. Similarly a conduit 95 connects into a passage 96 in the member 55 and leads into the cylinder 69. The cylinder members 43 and 55 have bleed ports 97 and 98 which are preferably protected by screens 99 to prevent clogging.

Control valve means is provided in the hydraulic system between the high pressure side of the pump and the clutch operating cylinders, and this control valve means is indicated in Figs. 3 to 7 inclusive. The valve is shown as comprising a body 100 with a chamber therein, which may be a cylinder, and the high pressure line communicates into the valve cylinder through an inlet port 101 and an inlet port 102. The line leading to the clutch A extends from an outlet port 103 and the line leading to the clutch B extends from an outlet port 104.

There is a two piece valve in the chamber comprising a valve member with a head or land 105 and a head or land 106 arranged to provide a port 107 therebetween. This valve member has an extension 110 upon which is mounted a sleeve valve 111 with a circumferential groove providing a port 112. The sleeve is slidably mounted upon the extension 110 and may be frictionally held in position by a spring pressed friction member 113 and the sleeve is held mounted on the extension by a head piece 114. For facilitating relative movement between the piston valve member and the sleeve the body is ported as at 115. A suitable operating member 120 is provided for manipulation and control of the valve and this may be arranged to be actuated by hand or automatically. The valve body is provided with end members 121 and 122 for limiting the movements of the valve members within the chamber.

Figure 4:
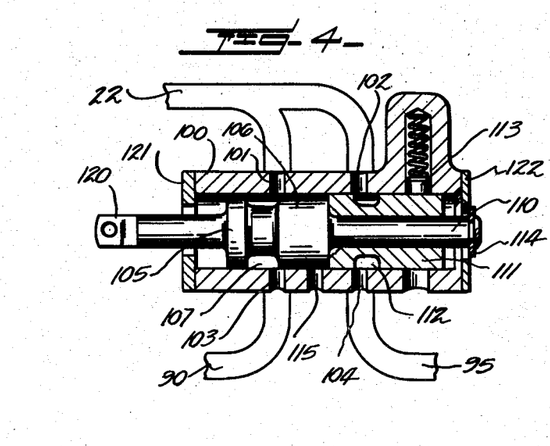
Figs. 4, 5 and 6 are sectional views similar to Fig. 3 showing different positions of the control valve in the making of a shift from one ratio to another.
Figure 5:
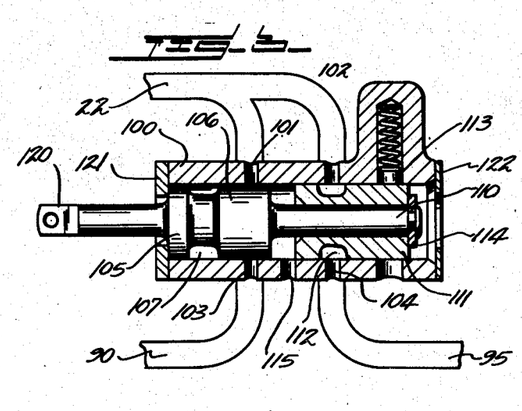
Figure 6:
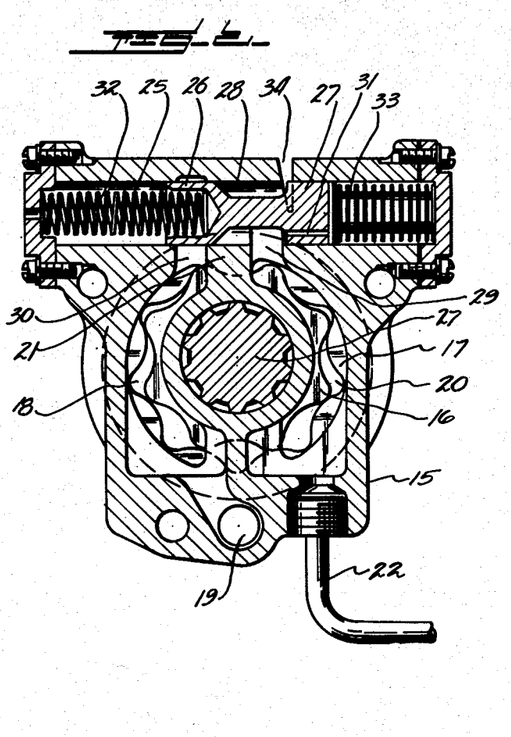

Before proceeding with a disclosure of the operation of the mechanism, the several valve positions may be considered. In Fig. 3, the piston valve is shown in its left hand position and the sleeve valve is shown in a position where it abuts the head 114. In this position the conduit 90 is closed to the high pressure line and the conduit 95 is open to the high pressure line. In Fig. 4 the piston valve has been moved to the right, as the figure is viewed, so that the conduit 90 has been opened to the high pressure line and the conduit 95 remains open to the high pressure line. In this connection, it will be noted that the port 112 has a greater axial extent than the ports 102 and 104. In the movement from the Fig. 3 position to the Fig. 4 position, the space between the sleeve valve and the land 106 has been closed, this being facilitated by the exhaust port 115. In the Fig. 5 position the piston valve and the sleeve valve have been moved further to the right and they are just in the position where the conduit 95 is closed from the high pressure line and the conduit 90 is connected to the high pressure line by the wide open valve and which has been wide open for a slight period prior to the closing of the ports for the conduit 95. In Fig. 6 the two valves have been moved to their extreme right hand position where the line 95 remains cut off from the high pressure and the line 90 remains connected to the high pressure. Figs. 3 to 6 inclusive show progressive movements of the valve in the making of a shift in the transmission in one ratio to another.

Figure 7:
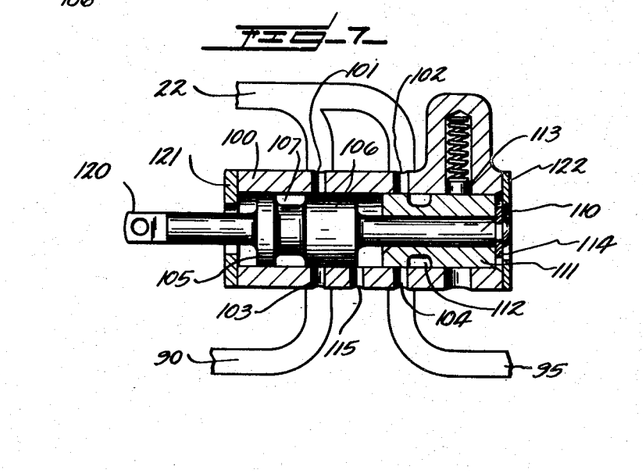
Fig. 7 is a sectional view showing the position of valve parts in the making of another shift in the transmission.

Fig. 7 shows an intermediate position of the valve members as they are moved back from the Fig. 6 position to the Fig. 3 position in the making of the other ratio shift in the transmission. Considering that the valve members are moving to the left in Fig. 7, the conduit 90 is already closed off from the high pressure line. This has occurred partially by movement of the piston valve independent of the sleeve. The sleeve has been moved slightly as it was picked up by the head 114 and is just in a position where it is to open the ports for the conduit 95. These several positions of the control valve are important and must be considered in the operation of the clutches of the transmission. In this connection it is, of course, appreciated that the conduits 90 and 95 extend respectively to the operating cylinder and piston structures of the clutches A and B, respectively. It is to be understood that the type of control valve shown in exemplary of the valve functions necessary in a shift as shown on Figs. 8 and 9 and is not necessarily the type which would be used in automotive practice.

In considering the operation of the transmission it will be appreciated that if the clutch A is engaged the torque is transmitted from the driving shaft 7 through the clutch A, hub 63 to shaft 50 through gear 51 to the output member 125, shown herein as a gear cluster. In the structure shown this is a relatively high speed ratio because of the relative size of the gear 51 and the gear 126 of the member 125. If the clutch B is engaged, the torque is transmitted from the driving shaft 7 through the sleeve 60 through clutch B through hub 66 to sleeve 52 and gear 53. Gear 53 meshes with the gear section 127 of the output or driven member 125. It will be understood that the driven member 125 may be considered a final output member or it may be connected by suitable gearing (not shown) to a final driven or output member 128. When the clutch B is engaged, a relatively low speed ratio is provided in that the engine is running relatively fast to a relatively slower operation on the output member 125.

In further considering the operation of the structure, it may be assumed that the parts are in the condition shown in Figs. 1 and 3. The pump being in operation the hydraulic medium is pumped from the sump into the high pressure line 22 through the control valve into conduit 95 which leads to the cylinder 69 so that the piston 80 is acted upon and the clutch plates of the clutch B are packed together. The reaction is taken by the member 72 as it is abutted by the end clutch plate 71. Now, assume that it is desired to make an upshift, that is, to shift up from a relatively low ratio to a higher ratio. The control valve is shifted from the position shown in Fig. 3 and we will assume that it has arrived at the position shown in Fig. 4. The hydraulic medium is now transmitted through the conduit 90 into the cylinder 46 and the piston 75 begins to shift to the right and starts to pack the clutch A. However, the hydraulic medium is still supplied under pressure to the cylinder 69 so that clutch B remains engaged. As a result, the engaging clutch A obtains its reaction to the hydraulic pressure from the clutch B because the end plate 70 abuts the end plate 71. As the control valve continues its movement and arrives at the position shown in Fig. 5, the high pressure line to the clutch A is wide open and the high pressure line to the clutch B has just been closed. This condition remains the same as the control valve moves from the position 5 to the position shown in Fig. 6. It will be understood of course, that Figs. 4, 5 and 6 show transition positions and the valve is not stopped in these positions. When the high pressure line to the clutch B is thus cut off by the control valve, and the pressure is conducted to the piston of the clutch A the cylinder for clutch B starts to bleed through the port 98 and the hydraulic pressure on piston 80 begins to drop. The hydraulic pressure on piston 75 is continuing and the torque capacity of clutch A is increasing. When its capacity is equal to the capacity of the disengaging clutch B plus the frictional torque of bodily moving the clutch plates of both clutches to the right as Fig. 1 is viewed, the whole nest of clutch plates is moved until the end plate 70 engages the abutment 72. At this instant the drive is changed from gear 53 to gear 51 without any interruption of power. After the lost motion has been taken up and the clutch plate 70 abuts the stop 72, the clutch A continues to engage independently of clutch B and clutch B continues its disengaging action. This disengaging action is continued because of the continuing decrease of pressure, the action of the springs 82 and the expanding action or tendency of the plates of clutch B.

Figure 8:
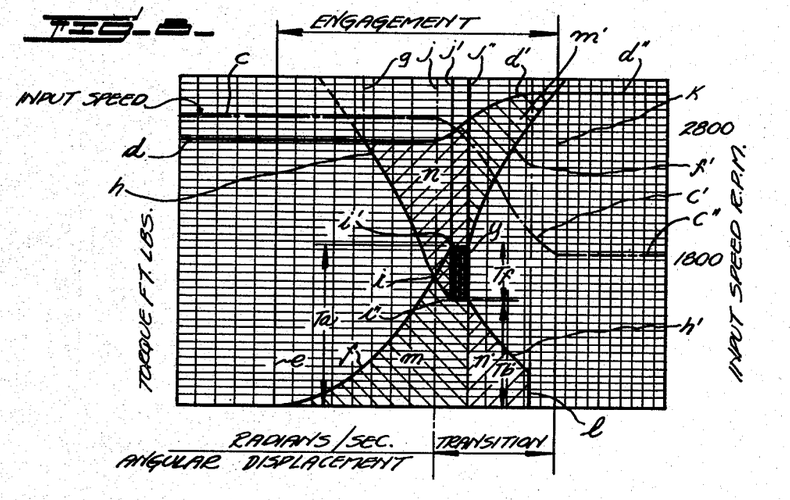
Fig. 8 is a view showing an energy or work graph of the functions in the making of an up shift, that is, a shift from a relatively low to a higher ratio.
Figure 9:
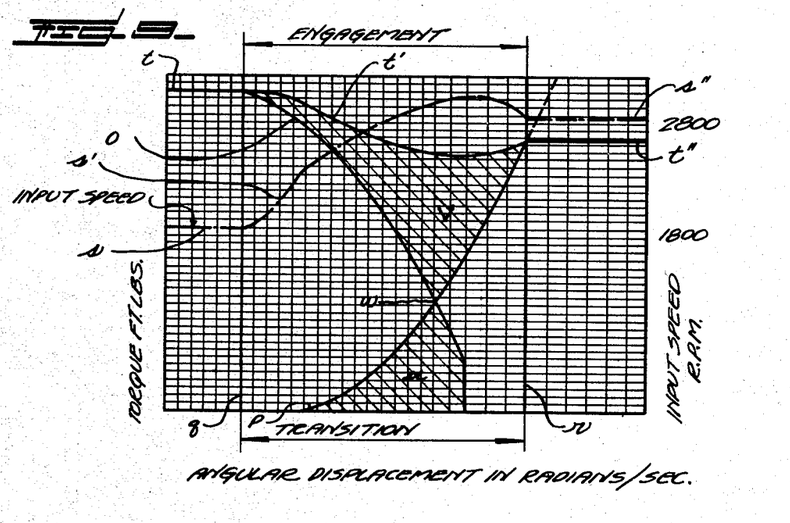
Fig. 9 is a similar energy or work graph illustrating the functions of a down shift, that is, a shift from a relatively high ratio to a relatively low ratio.

The action will be better appreciated by reference to Fig. 8 which shows the functions which occur in the shift up to a higher speed ratio. It will be appreciated that both Figs. 8 and 9 are energy or work graphs, in that the ordinates are in terms of torque plotted against abscissa in terms of angular displacement or radians per second. Any area is therefore a measure of torque per second which divided by the proper constant will give a direct result in horse-power. In the low speed ratio and before the start of the upshift the engine speed is as indicated by $c$ delivering torque indicated by $d$. The first action is the commencement of engagement of the clutch A at the line $e$ and the engagement or energy absorption curve is indicated at $f$. The clutch B remains fully engaged because of the valve function above mentioned but when the control valve reaches the position shown in Fig. 5, the clutch B begins to disengage at the line $g$. The disengaging curve is shown at $h$. As the clutch A continues engagement and the clutch B continues disengagement, their curves meet at a relatively indeterminate intermediate location as indicated at $i$. At this point the two clutches are absorbing the entire existing engine torque, and zero horse power is transmitted through to the output shaft. Clutch A continues to engage to the point $i$ where its torque is measured by $T_a$, and clutch B continues to disengage to the point $i''$ where its remaining torque is measured by $T_b$. $T_f$ represents the frictional torque of the toothed clutch plates 61, 62, 70, 71, 64 and 65 bearing against the toothed members 60, 63 and 66.

When $T_a = T_b + T_f$, the clutch plates are moved bodily to the right as Fig. 1 is viewed, the movement ceasing when plate 70 contacts abutment 72. This action is completed at $j''$ on Fig. 8, and marks the point where the inter-dependent function ceases and clutch A acquires its own reaction member 72. Its torque continues to increase along the engagement line $j'$ while clutch B continues to disengage as shown at $h'$ until it reaches the point $l$ where the pressure of springs 82 over balance the remaining hydraulic pressure on piston 80. When the engagement curve of clutch A reaches the point $k$, slippage of the clutch ceases and engine speed levels off as at $c''$, the engine speed dropping through the transition stage as shown at $c'$. The engine torque during the shift increases from an initial valve of $d$ through a transitional valve of $d'$ and finally levels off at a valve of $d''$. In the graph it has been assumed that the ratio change, assuming a constant vehicle speed, involves a change in engine speed from 2880 R. P. M. to 1800 R. P. M.

In general, some things concerning the graph of Fig. 8 should be noted. For example, the torque of engaging clutch A as shown at $i'$ is indicated as being constant between $j'$ and $j''$ or during the period of plate movement. It is reasonable to assume that this condition is not quite true since it is well known that a static coefficient of friction is greater than a dynamic one. Therefore, the slope of the engagement line from $i'$ will probably drop slightly. Likewise the disengaging torque of clutch B, from the point $i''$ is shown to be constant between $j'$ and $j''$. This also is probably not quite true since when the clutch plates and piston 80 start to move, more oil must be discharged through the fixed orifice 98 in a given time and the torque capacity line of clutch B will probably increase slightly beyond the point $i''$. Both of these effects will change the frictional energy area $y$ to some degree, but since this frictional energy is internal only and has no effect on the power transmitted to the output shaft, the area $y$ is shown as being rectangular for the sake of simplicity.

It should also be noted that the abscissa are designated as "radians/sec." The actual time of the complete shift as between $e$ and $k$ should be about one second, so the abscissa as shown are actually in radians/fraction of a second.

Another point to be brought out in Fig. 8 is that the transition or shift stage occurs between $j$ and $k$ as shown by the graduated change in the value of the abscissa. Up until the time the torque transmitted by the engaging clutch A substantially equals that transmitted by the disengaging clutch B both clutches are under the control of a common pressure so that the dictates of one is determined by the dictates of the other under various torque or speed conditions. However, at the moment the clutch A begins to transmit more torque than the disengaging clutch B and to function independently, it continues with its slipping and engaging action until finally engaged.

In the making of a power shift, there is an energy loss and it is represented by the areas $m$, $m'$, $n$ and $n'$. As the clutch A begins to engage and is thus slipping, the loss of energy is represented by the area $m$ and when the clutch B begins to slip the loss of energy is represented by the area $n$ and at the location $i$, no useful torque is being delivered to the power output member. As the action continues beyond the location $j''$ the energy loss incident to the engaging clutch A is indicated by the area $m'$ and the energy loss incident to the continued disengagement of the clutch B is represented by the area $n'$.

Refer now to the action of the control valve, and assume that a down shift is to be made in which the valve is shifted from the Fig. 6 position back to the Fig. 3 position. The first thing that happens is that the piston valve is shifted to the left as the figures are viewed to close off the hydraulic pressure to the clutch A and, therefore, clutch A may start to disengage by the bleeding of the medium through the port 97. The abutment 114 now picks up the sleeve valve as indicated in Fig. 7 and then the two valve members move in unison to the Fig. 3 position thus introducing the hydraulic medium through the conduit 95 to start engagement of the clutch B.

The functions are indicated in the graph, as shown in Fig. 9, wherein the disengagement curve of clutch A is shown at $o$ and it will be seen that its disengagement starts in advance of the engagement of the action of the clutch B whose engagement curve is shown at $p$. The transition stage may extend substantially from line $q$ at the beginning of the disengagement of clutch A, to line $r$, at the completion of the engagement of the clutch B. The engine speed prior to the shift is indicated at $s$ and the engine R. P. M. may increase through the transition stage, as shown at $s'$, and then may level off at $r$ as shown at $s''$. The torque curve at the beginning is shown at $t$ and it drops through the transition stage as shown at $t'$ and levels off at $t''$. The areas $u$ and $v$ indicate the energy loss during the shift and at the point $w$ where the two curves cross, no useful energy is transmitted to the power output member.

The shift down is relatively more easily made than the shift up. This is because of the natural conditions existing including the fact that the engine speed increases. For example, the graph shown in Fig. 9 shows an engine speed increase from 1800 R. P. M. to 2880 P. R. M. As the clutch A starts to slip in its disengagement action the engine speed increases along the curve $s'$. Indeed, the engine speed may exceed 2880 R. P. M. as indicated as it tends to run away incident to the clutch slippage. However, the clutch B is engaging or acting as a brake on the increasing engine speed and when it becomes finally engaged at $r$ the engine speed levels off at 2880 R. P. M. as indicated.

I claim:

1. A mechanism for transmitting torque comprising, a driving member, a driven member, means including a friction clutch for establishing a driving connection between the driving member and the driven member at one speed ratio, means including a friction clutch for establishing a driving connection between the driving member and the driven member at a different speed ratio, said clutches having means for reaction one upon the other, and clutch operating means operable to apply packing pressure to one clutch to cause its engagement and operable to relieve packing pressure on the other clutch for its disengagement, said clutch operating means being arranged and constructed so that the packing pressure applied to one clutch for causing its engagement obtains reaction by the packing pressure of and through the other clutch prior to the relief of the packing pressure on said other clutch, whereby the engaging action of said one clutch and the disengaging action of the other clutch are inter-dependent and thereby relatively timed.

2. A mechanism for transmitting torque comprising, a driving member, a driven member, means including a friction clutch for establishing a driving connection between the driving member and the driven member at one speed ratio, means including a friction clutch for establishing a driving connection between the driving member and the driven member at a different speed ratio, means for applying packing pressure selectively to the clutches for engagement and disengagement thereof to effect the different driving speed ratios, said clutches having means for reaction one upon the other and being arranged so that when packing pressure is applied to one of them the other remains engaged for a period during the early stages of engagement of said one clutch and provides the reaction for the packing pressure of said one clutch whereby the engaging and disengaging actions are inter-dependent and thereby relatively timed, the operating means being arranged to release the packing pressure of said other clutch after said initial engagement of said one clutch.

3. A mechanism for transmitting torque comprising, a driving member, a driven member, means including a friction clutch for establishing a driving connection between the driving member and the driven member at one speed ratio, means including a friction clutch for establishing a driving connection between the driving member and the driven member at a different speed ratio, clutch operating means for applying packing pressure selectively to the clutches for the engagement and release thereof to thereby establish the different ratios, said operating means being arranged and constructed to apply packing pressure to one clutch which is about to be engaged and to maintain the packing pressure on the other clutch which is about to be disengaged, said clutches having means for reaction one upon another and being arranged so that the packing pressure of said other clutch provides the reaction for the packing pressure of said one clutch through the early stages of engagement of said one clutch and reaction means for the packing pressure of said clutch effective to relieve said other clutch of such packing pressure following a substantial engagement of said one clutch.

4. A mechanism for transmitting torque comprising, a driving member, a driven member, means including a friction clutch for establishing a driving connection between the driving member and the driven member at one speed ratio, means including a friction clutch for establishing a driving connection between the driving member and the driven member at a different speed ratio, said clutches being arranged in back to back relationship so that the packing pressure applied to one clutch obtains a reaction from the packing pressure of the other clutch transmitted through said other clutch, operating means for selectively applying packing pressure to the clutches for establishing the different speed ratios, and other reaction means for taking the reaction of the pressure of said one clutch after said one clutch has been partially engaged through the reaction provided by said other clutch.

5. A mechanism for transmitting torque comprising, a driving member, a driven member, means including a first friction clutch for establishing a driving connection between the driving member and the driven member at a relatively high speed ratio, means including a second friction clutch for establishing a driving connection between the driving and driven member at a relatively low speed ratio, operating means for applying packing pressure for engagement of one clutch and disengagement of the other clutch, said operating means being operable to apply packing pressure to the first clutch while maintaining packing pressure on the second clutch, said clutches being so relatively associated that the packing pressure thus applied to the first clutch obtains reaction from the packing pressure of the second clutch, other reaction means for taking the reaction of the pressure of the first clutch after the first clutch has been partially engaged, the operating means being operable to relieve the packing pressure of the second clutch after the first clutch has been partially engaged whereby the engagement of the first clutch and the disengagement of the second clutch are inter-dependent and thereby relatively timed.

6. A mechanism for transmitting torque comprising, a driving member, a driven member, means including a first friction clutch for establishing a driving connection between the driving member and the driven member at a relatively high speed ratio, means including a second friction clutch for establishing a driving connection between the driving and driven member at a relatively low speed ratio, operating means for applying packing pressure for engagement of one clutch and disengagement of the other clutch, said operating means being operable to apply packing pressure to the first clutch while maintaining packing pressure on the second clutch, said clutches being disposed in back to back arrangement with the operating means applying pressure thereto at the remote sides of the clutches, a reaction member positioned between the clutches arranged for relative clearance so that the second clutch may provide reaction for the packing pressure of the first clutch, the operating means being operable to apply packing pressure to the first clutch while maintaining packing pressure on the second clutch so that the second clutch provides the reaction for the first clutch during its initial engaging action, the operating means being operable to relieve the packing pressure on the second clutch so that the reaction member provides the reaction for the first clutch subsequent to its initial engagement.

7. A mechanism for transmitting torque comprising, a driving member, a driven member, means including a friction clutch for establishing a driving connection between the members at one speed ratio, means including a friction clutch for establishing a driving connection between the members at a different speed ratio, said clutches being disposed in a back to back relationship, a reaction member between the clutches having a clearance so that one clutch may back against and provide reaction for the other, hydraulic control means for the clutches including a cylinder and a piston for each clutch and located adjacent their remote faces so that the pistons act in opposition to each other, and controlling valve means for the hydraulic system arranged to apply packing pressure on the piston for engaging one clutch while maintaining packing pressure on the piston of the other clutch, whereby said other clutch provides reaction for the engagement of the said one clutch, said controlling valve means being arranged to cut off the pressure from the piston of said other clutch for the disengagement of said other clutch, with the reaction for the packing pressure of said one clutch then being taken by the reaction member, whereby the engaging action of said one clutch and the disengaging action of the other clutch are inter-dependent and relatively timed.

8. A mechanism for transmitting torque comprising, a driving member, a driven member means including a first friction clutch for establishing a driving connection between the members at a relatively high speed ratio, means including a second friction clutch for establishing a driving connection between the members at a relatively low speed ratio, said clutches comprising multiple clutch plates and disposed in back to back relationship, a pair of cylinders with pistons therein operable in opposition to each other upon the remote plates of the clutches, hydraulic means including a control valve for introducing a hydraulic medium under pressure to the cylinders for operating the clutches, said control valve being so constructed as to introduce the hydraulic medium to the cylinder for the first clutch for engaging the same while maintaining the hydraulic medium in the cylinder for the second clutch, whereby the second clutch reacts against the first clutch, reaction means positioned between the clutches for taking the reaction of the first clutch subsequent to partial engagement thereof, said control valve being arranged to relieve the hydraulic pressure in the cylinder for the second clutch for disengagement of the second clutch and continued engagement of the first clutch with the reaction taken by the reaction means, so that the engaging action of the first clutch and the disengaging action of the second clutch are inter-dependent.

9. A mechanism for transmitting torque comprising, a driving member, a driven member, means including a first friction clutch for establishing a driving connection between the members at a relatively high speed ratio, means including a second friction clutch for establishing a driving connection between the members at a relatively low speed ratio, said clutches comprising multiple clutch plates and disposed in back to back relationship, a pair of cylinders with pistons therein operable in opposition to each other upon the remote plates of the clutches, hydraulic means including a control valve for introducing a hydraulic medium under pressure to the cylinders for operating the clutches, said control valve being so constructed as to introduce the hydraulic medium to the cylinder for the first clutch for engaging the same while maintaining the hydraulic medium in the cylinder for the second clutch, whereby the second clutch reacts against the first clutch, said control valve being arranged to discontinue the supply of hydraulic medium to the cylinder for the second clutch, said cylinder for the second clutch having a bleed port for the medium, so that the second clutch provides a diminishing reaction to the engagement of the first clutch, and fixed reaction means disposed between the clutches for taking the reaction of the first clutch subsequent to its initial engagement.

10. A mechanism for a transmitting torque comprising a driving member and a driven member, means including a friction clutch such as clutch A for establishing a driving connection betweeen the members at a relatively high speed ratio, means including a friction clutch such as clutch B for establishing a drive connection between the members at a relatively low speed ratio, said clutches each comprising driving and driven discs, a common drive member for the driving discs of the two clutches upon which the discs are slidable, separate members for the driven discs of each clutch upon which the discs are slidable, the discs of the clutches being arranged in back to back relationship, an intervening reaction member disposed between the clutches and having clearance with respect thereto, operating means for selectively applying packing pressure to the remote end discs of the clutches for respective engagement and disengagement to establish the different ratios, said operating means including control means for applying packing pressure to clutch A while maintaining packing pressure on clutch B, whereby clutch B provides reaction for clutch A, so that the engagement of clutch A and the disengagement of clutch B are inter-dependent and are relatively timed, said control means being operable to relieve the pressure on clutch B for shift of the discs of both clutches while clutch B provides reaction to clutch A until one end disc of clutch A abuts the said reaction means to thereby relieve clutch B of the packing pressure of clutch A.

11. A mechanism for transmitting torque comprising, a driving member, a driven member, means including a friction clutch for establishing a driving connection between the members at one speed ratio, means including a friction clutch for establishing a driving connection between the members at a different speed ratio, said clutches being disposed in back to back relationship, a reaction member between the clutches having a clearance so that one clutch may back against and provide reaction for the other, pressure applying means operable on the remote faces of the clutches so as to act in opposition to each other, and controlling means arranged to render the pressure applying means for one clutch effective while maintaining the pressure applying means for the other clutch effective, whereby said other clutch provides reaction for the engagement of said one clutch, said controlling means being arranged to render the pressure applying means for the said other clutch ineffective following initial engagement of said one clutch for the disengagement of said other clutch with the reaction for the pressure of said one clutch then being taken by the said reaction member, whereby the engaging action of said one clutch and the disengaging action of the other clutch are inter-dependent and relatively timed.

12. In a mechanism for transmitting torque, two friction clutches for the transmission of torque between driving and driven members at different speed ratios when alternately engaged and disengaged, said clutches being so related that when packing pressure is applied to one clutch which is about to be engaged the packing pressure on the other clutch which is about to be disengaged provides reaction therefor and continues providing such reaction while being relieved, and other reaction means operable after said one clutch is partially engaged and said other clutch is partially disengaged for providing reaction to the packing pressure applied to said one clutch so that the said other clutch is relieved of said packing pressure for the completion of the engagement of said one clutch and the completion of the disengagement of said other clutch.

13. In a mechanism for transmitting torque, two friction clutches for the transmission of torque between driving and driven members at different speed ratios when alternately engaged and disengaged, said clutches being of the disc type and disposed in back to back relationship, each clutch having a back plate arranged for reaction against the back plate of the other, and each clutch arranged to have packing pressure applied to its remote face, so that when packing pressure is applied to one clutch, which is about to be engaged, the packing pressure on the other clutch, which is about to be disengaged, provides reaction therefor and continues providing such reaction while being relieved, and other reaction means, operable after said one clutch is partially engaged and said other clutch is partially disengaged, to engage the back plate of said one clutch to provide reaction to the packing pressure applied thereto and thereby relieve said other clutch of the packing pressure of said one clutch, for the completion of engagement of said one clutch and the completion of disengagement of the said other clutch.

14. In a mechanism for transmitting torque, two friction clutches for the transmission of torque between driving and driven members at different speed ratios when alternately engaged and disengaged, said clutches being of the disc type, said clutches being arranged in back to back relationship and each having a back plate arranged to react against the back plate of the other, said back plates being slidable, a reaction member positioned between the two back plates with respect to which the two back plates are slidable, said clutches adapted to have packing pressure applied to their remote faces, so that when packing pressure is applied to one clutch, which is about to be engaged, the packing pressure on the other clutch, which is about to be disengaged, provides reaction therefor and continues providing reaction while being relieved as the back plates slide, the reaction member engaging the back plate of said one clutch when said one clutch is partially engaged and said other clutch is partially disengaged, for providing reaction to the packing pressure applied to said one clutch to thereby relieve said other clutch of the packing pressure applied to said one clutch, for the completion of engagement of said one clutch and the completion of disengagement of the said other clutch.

ERNEST E. WEMP.

REFERENCES CITED

The following references are of record in the file of this patent:

UNITED STATES PATENTS

| Number | Name | Date |
| --- | --- | --- |
| 794,899 | Sturtevant et al. | July 18, 1905 |
| 1,619,701 | Chorlton | Mar. 1, 1927 |
| 1,619,703 | Chorlton | Mar. 1, 1927 |
| 1,619,705 | Chorlton | Mar. 1, 1927 |
| 2,279,986 | Griswold | Apr. 14, 1942 |
| 2,320,960 | Wheaton | June 1, 1943 |